Patented Dec. 24, 1946

2,413,121

UNITED STATES PATENT OFFICE 2,413,121

GREASES

Reuben A. Swenson, Hammond, Ind., assignor to Standard Oil Company, Chicago, Ill., a corporation of Indiana No Drawing. Application March 20, 1944,
Serial No. 527,352

8 Claims. (Cl. 252—41)

The present invention relates to improvements in the manufacture of greases, and more particularly to improvements in the manufacture of greases of the type suitable for use on open bearings at high temperatures, for example such greases commonly known as mill greases.

Greases of this type prepared from fats or fatty acids, such as tallow, rosin or rosin oil and caustic soda have heretofore been made by mixing all of the fat or fatty acid with about one-half of the total mineral oil content of the grease and all of the alkali such as sodium hydroxide. After the tallow has been completely saponified, the rosin or rosin oil is then added to effect a reaction between the excess alkali and the rosin or rosin acid. Finally the remaining portion of the mineral oil is graded in the grease. If the grease is acid, additional alkali is added to form a finished product which is neutral or slightly alkaline. The prior art method of preparing mill greases of this type is described in Arveson Patent No. 1,882,721 of October 18, 1932.

This method of preparing mill greases presents several undesirable features. One of the principal objectionable features is that in the old method of preparing mill grease, at least two periods of excessive foaming are encountered, one period being during the addition of rosin or rosin oil to the mixture and the second period being encountered when the balance of the caustic is added. Because of the excessive foaming occurring during the preparation of the grease, the batch sizes had to be reduced in order to avoid spilling over due to the foaming. In addition to the objectionable manufacturing features encountered in the preparation of mill greases by the methods heretofore employed, the grease itself was not entirely satisfactory. Frequently such greases were non-uniform and had a low softening time.

It is an object of the present invention to provide an improved method of preparing mill greases.

Another object of the invention is to provide an improved method of preparing mill greases which eliminates excessive foaming and thereby makes possible increased batch sizes.

Another object of the invention is to provide a method of preparing mill greases which will result in a product which is uniform from batch to batch in appearance, structure and physical properties.

Still another object of the invention is to provide a method of preparing mill greases which will result in products having superior heat-resistant properties.

Other objects and advantages of the present invention will become apparent from the following description thereof.

I have discovered that the foregoing objects can be attained by preparing greases of the mill grease type in the following manner. All of the required fatty material, i. e., fat or fatty acid, and the rosin acid-containing material, i. e. rosin or rosin oil, are charged to the mixer and heated to a temperature of from about 220° F. to about 280° F., and preferably to a temperature of about 240° F. to about 260° F. The caustic soda in a 48° Baumé solution is then added to the mixture in the mixer in small quantities, preferably in 3 to 5 dumps, the batch being reheated to a temperature of about 250° F. to about 270° F., and preferably at about 250° F. to about 255° F. before each successive addition of caustic soda. After all of the caustic soda is added and the material in the mixer has become heavy, the temperature of the batch is raised to a temperature of from about 280° F. to about 400° F., and preferably from about 300° F. to about 320° F. and held at this temperature for a period of about 10–60 minutes and preferably for about 30 minutes. The acidity-alkalinity value of the batch is then adjusted within the range of 2% acid determined as oleic acid to about 0.2% caustic soda. As soon as the acidity-alkalinity value of the mass has been adjusted within the desired titration range, and preferably after a substantial portion of the water has been evaporated from the batch, all of the mineral oil is graded in as rapidly as possible. As soon as all of the oil has been graded in, the grease is heated to a temperature of about 390° F. to about 425° F. and preferably from about 400° F. to about 410° F. for filling. Optionally a portion of the hydrocarbon oil can be added to the mixture of fat or fatty acid and rosin or rosin oil.

In preparing the improved mill type grease, rosin, rosin oil or other rosin acid-containing materials can be used. Suitable fats or fatty acids are tallow, stearic acid, lard oil, cotton seed oil, oleostearine, acidless tallow oil, standard fatty acid, or other fats or fatty acids. The hydrocarbon oil employed may be any viscous hydrocarbon oil having the desired flash and viscosity characteristics. Suitable hydrocarbon oils are mineral oils having Saybolt Universal viscosities of from about 80 seconds at 100° F. to about 250 seconds at 210° F. While I prefer to employ sodium hydroxide as the saponifying agent, I may use other alkali metal hydroxides, such as potassium hydroxide. Small amounts of lime soap can be used in combination with the alkali metal soaps to obtain certain desired properties.

Illustrative of greases prepared by my improved method of manufacture are the soda-rosin greases of the mill grease type. These greases generally are prepared from the following ingredients in the following approximate proportions:

| | Pounds |
|---|---|
| Fatty material | 2.0 to 13 |
| Rosin-acid-containing material | [1] 2.5 to 15 |
| Dry caustic | 0.6 to 4 |
| Petroleum oil | 95.0 to 70 |

[1] As rosin acid.

The following typical formulae are illustrative of the type of mill greases which can be prepared by the method of the present invention:

| | Grease A | Grease B |
|---|---|---|
| Rosin oil_____pounds__ | 26.0 | 16.7 |
| Prime tallow_____do____ | 12.2 | 7.9 |
| Dry caustic soda_____do____ | 3.2 | 2.2 |
| Petroleum oil_____do____ | 60.0 | 74.0 |
| S. U. vis. at 100° F. of oil_____seconds__ | 425–450 | 215–225 |

Suitable mill greases can also be prepared by employing rosin in place of rosin oil, and standard fatty acid in place of tallow. Illustrative of mill greases so prepared are greases of the following formulation:

| | Grease C | Grease D |
|---|---|---|
| | Pounds | Pounds |
| Rosin | 10.1 | 13.4 |
| Standard fatty acid | 8.6 | 11.4 |
| Dry caustic soda | 2.44 | 3.26 |
| Petroleum oil [1] | 79.9 | 36.7 |
| Petroleum oil [2] | | 36.7 |

[1] Saybolt Universal viscosity at 100° F. 210–225 seconds.
[2] Saybolt Universal viscosity at 100° F. 900–920 seconds.

When using rosin in place of rosin oil as in the above formulation, the method of manufacture is substantially the same as that described above with the exception that a small amount of petroleum oil is added to the mixture of standard fatty acid and rosin and the mixture maintained at a temperature of about 250° F. to about 275° F. until all of the rosin is melted. The caustic soda in a 48° Baumé solution is then added in small increments, preferably in 3 to 5 dumps, while maintaining a temperature within the range of 250° F. to about 275° F. and preferably at about 260° F. After each addition of caustic soda, the mixture is heated vigorously in order to flash out the water as rapidly as possible. After the last addition of caustic, the batch is heated vigorously until foaming ceases and the base drops and becomes heavy. After the acidity-alkalinity value of the batch has been adjusted as above described, the petroleum oil is graded in as rapidly as possible. After all of the oil has been graded in, the batch is then heated to the filling temperature, above described, until the batch is liquid and free of foam.

The "standard fatty acid" referred to herein are mixed fatty acids of the following specification:

| | |
|---|---|
| Titre | 32–39° C. |
| Color | 3 N. P. A. maximum |
| Fatty acids | 93% minimum |
| Moisture impurities and unsaponifiable | 5% maximum |

These standard fatty acids are well known in the grease making trade and may comprise a mixture of about 40% animal fatty acids and about 60% cotton seed fatty acids.

Greases prepared in accordance with the present invention, as above described, are uniform in appearance, structure, and physical properties from batch to batch. Such greases have superior heat-resistant properties as determined by the softening time test at 300° F. using 85 grams total weight. Softening time is an index of quality from the service standpoint and is measured by a test in which a cylinder of the grease ½ inch in diameter and about ⅝ inch long is heated by an oil or mercury bath to the desired test temperature while being subjected to the weight of an 85 gram cylinder which provides a pressure on the grease comparable to the pressure to which the compound is subjected in actual operation. Softening time is defined as the time required to flatten the test cylinder ¼ inch under these conditions. Mill greases prepared according to the prior art method, as described in the Arveson Patent 1,882,721, usually have a low softening time varying from about 80 seconds to about 200 seconds. Mill greases prepared in accordance with the present invention have a substantially uniform softening time of a minimum of 300 seconds, that is, at 300 seconds the test cylinder showed substantially no flattening or movement. In addition to the improvement obtained in the product, the present invention makes possible the preparation of larger batches of mill greases using comparable quantities of ingredients. For example, the batch size of grease A (supra) has been increased from 1800 pounds to 2200 pounds while the batch size of grease B (supra) has been increased from 1400 pounds to about 2200 pounds.

While the present invention has been described by reference to various representative compounds and has been illustrated by reference to specific examples thereof, the invention is not to be limited to the various named compounds or to the specific examples but includes within its scope such modifications as come within the spirit of the appended claims.

I claim:

1. The method of manufacturing high temperature greases of the mill grease type containing an alkali metal soap of a fatty material selected from the class consisting of a non-drying fatty material and a semi-drying fatty material and an alkali metal rosin soap, comprising mixing the fatty material and the rosin acid-containing material, heating the mixture to a temperature of from about 220° F. to about 280° F., adding to the heated mixture an alkali metal hydroxide in small increments, reheating the mixture to a temperature of about 250° F. to about 270° F. before each successive addition of the alkali metal hydroxide, increasing the temperature of the mixture after the addition of all of the alkali metal hydroxide to a temperature of from about 280° F. to about 400° F., grading in the hydrocarbon oil, and then increasing the temperature to about 390° F. to about 425° F. for filling out the grease.

2. The improvement in the manufacture of high temperature greases of the mill grease type as described in claim 1 in which the fatty material is tallow, the rosin acid-containing material is rosin oil and the alkali metal hydroxide is sodium hydroxide.

3. The method of preparing an improved high temperature grease of the mill grease type comprising mixing a fatty material selected from the class consisting of a non-drying fatty material and a semi-drying fatty material with a rosin acid-containing material, heating the mixture to a temperature of from about 220° F. to about 280° F., adding an alkali metal hydroxide in small increments to said mixture while the same is maintained within said temperature range, adjusting the acidity-alkalinity value of the saponified mixture within the range of 2% acid determined as oleic acid to about 0.2% caustic soda, maintaining the saponified mixture at a temperature of from about 280° F. to about 400° F. until a substantial portion of the water is removed from the batch, rapidly grading in the hydrocarbon oil, and then increasing the temperature of the mass to about 390° F. to about 425° F. for filling out the same.

4. The improved method of preparing a high temperature grease comprising heating a mixture of tallow and rosin oil to a temperature of from about 240° F. to about 260° F., adding caustic soda in small increments to the heated mass, reheating the mixture to a temperature of about 250° F. to about 255° F. before each successive addition of caustic soda, increasing and maintaining the temperature of the mass to about 300° F. to about 320° F. for a period of about 30 minutes, adjusting the acidity-alkalinity value of the mass within the range of 2% acid determined as oleic acid to about 0.2% caustic soda, rapidly grading in the hydrocarbon oil, and then increasing the temperature of the mass to about 400° F.–410° F. for filling.

5. The method of preparing an improved high temperature grease comprising heating a mixture of rosin, higher fatty acids selected from the class consisting of non-drying higher fatty acids and semi-drying higher fatty acids and a small amount of a hydrocarbon oil to a temperature of about 250–275° F. until all of the rosin is melted, adding caustic soda in small increments to the heated mixture, heating the mixture vigorously to flash out the water as rapidly as possible after each addition of caustic soda, maintaining the mass at a temperature of 250–275° F. until foaming ceases and the base becomes heavy, adjusting the acidity-alkalinity value of the mass within the range of about 2% acid determined as oleic acid to about 0.2% caustic soda, grading in the remaining portion of the hydrocarbon oil as rapidly as possible, and then increasing the temperature of the grease to about 400° F.–410° F. for filling.

6. A high temperature grease prepared from the following ingredients in the following approximate proportions:

| | Pounds |
|---|---|
| Rosin acid-containing material | [1] 2.5 to 15 |
| Fatty material selected from the class consisting of a non-drying fatty material and a semi-drying fatty material | 2.0 to 13 |
| Petroleum oil | 95.0 to 70 |
| Dry alkali metal hydroxide | 0.6 to 4 |

[1] As rosin acid.

said grease being prepared by the method comprising mixing all of the rosin acid-containing material and fatty material together, heating the mixture to 250° F., adding a water solution of the alkali metal hydroxide in small increments to the heated mixture, reheating the mixture to 250–255° F. before each successive addition of alkali metal hydroxide, increasing the temperature of the mixture after the addition of all of the alkali metal hydroxide to about 300–320° F., maintaining the mixture at said last temperature for a period of about 10 to 60 minutes, adjusting the acidity-alkalinity value of the mixture within the range of about 2% acid determined as oleic acid to 0.2% caustic soda, grading in the petroleum oil, and heating the mass to about 395° F.–425° F. for filling.

7. An improved high temperature grease prepared from the following ingredients in the following approximate proportions:

| | Pounds |
|---|---|
| Rosin oil | 16.7 to 26 |
| Prime tallow | 7.9 to 12.2 |
| Petroleum oil | 60 to 74 |
| Dry caustic soda | 2.2 to 3.2 | said grease being prepared by the method comprising mixing all of the rosin oil and prime tallow together, heating the mixture to 250° F., adding the caustic soda in a 48° Baumé solution in small increments to the heated mixture, reheating the mixture to 250–255° F. before each successive addition of caustic, increasing the temperature of the mixture after the addition of all of the caustic soda to about 300–320° F., maintaining the mixture at said last temperature for a period of about 10–60 minutes, adjusting the acidity-alkalinity value of the mixture within the range of about 2% acid determined as oleic acid to 0.2% caustic soda, grading in the petroleum oil, and heating the mass to about 400° F.–410° F. for filling.

8. An improved high temperature grease prepared from the following ingredients in the approximate following proportions:

| | Pounds |
|---|---|
| Rosin | 10.1 to 13.4 |
| Standard fatty acids | 8.6 to 11.4 |
| Dry caustic soda | 2.44 to 3.26 |
| Petroleum oil | 73.4 to 79.9 | said grease being prepared by the method comprising mixing the rosin, standard fatty acids and a portion of the petroleum oil in a mixer maintained at a temperature of about 250° F.–275° F. until all the rosin is melted, adding a 48° Baumé solution of the caustic soda in small increments to the mixture while maintaining the same at a temperature within the range of about 250° F. to about 275° F., heating the mixture vigorously after each addition of caustic soda to rapidly flash out the water, maintaining the mixture at a temperature within the range of 250° F. to about 275° F. until foaming ceases and the mass becomes heavy, adjusting the acidity-alkalinity value of the mass within the range of about 2% acid as oleic acid to about 0.2% caustic soda, grading in the remaining portion of the petroleum oil as rapidly as possible, and raising the temperature of the mass after all the oil has been graded in to a temperature within the range of about 400° F. to about 410° F. for filling the same.

REUBEN A. SWENSON.